United States Patent [19]

Lewis

[11] Patent Number: 4,647,165
[45] Date of Patent: Mar. 3, 1987

[54] OPTICAL VIEWING ACCESSORY

[76] Inventor: Stanley P. Lewis, 1252 Pequot Ave., Southport, Conn. 06490

[21] Appl. No.: 675,352

[22] Filed: Nov. 27, 1984

[51] Int. Cl.$^4$ .......................... G02C 9/02; G02B 27/02
[52] U.S. Cl. ......................................... 351/59; 351/57; 351/158; 350/145
[58] Field of Search ................... 351/57, 58, 59, 158, 351/170, 175; 350/145

[56] References Cited

U.S. PATENT DOCUMENTS

| | | |
|---|---|---|
| 1,818,355 | 8/1931 | Readeker . |
| 2,123,682 | 7/1938 | Wingate . |
| 2,175,396 | 10/1939 | Jiranek . |
| 2,358,348 | 7/1944 | Pierson et al. ...................... 350/287 |
| 2,594,698 | 4/1952 | Thomas ............................... 350/145 |
| 2,618,199 | 11/1952 | Evans .................................. 350/145 |
| 3,423,150 | 1/1969 | Freed . |
| 3,741,634 | 6/1973 | Stoltze ................................. 351/57 |
| 3,840,294 | 10/1974 | Kneier .................................. 351/59 |

Primary Examiner—John K. Corbin
Assistant Examiner—P. M. Dzierzynski
Attorney, Agent, or Firm—Cifelli, Frederick & Tully

[57] ABSTRACT

An optical viewing system for use by bicycle riders and the like to increase the field of vision thereof includes headgear for supporting the system on the head of the user and an optical viewing accessory attached to the headgear. The optical viewing accessory has a pair of prisms thereon mounted for pivotal movement between retracted and extended positions. In their retracted positions, the prisms do not interfere with the direct line of sight of the user. However, in their extended positions, the prisms intersect the direct line of sight of the user and the internal reflection and refraction of the prisms allow the user to view objects located at positions at an angle, approximately ninety degrees, from the direct line of sight. The pivotal movement of the optical viewing accessory is activated under the influence of gravity as the head of the user is manipulated alternatively between the erect and prone positions.

20 Claims, 7 Drawing Figures

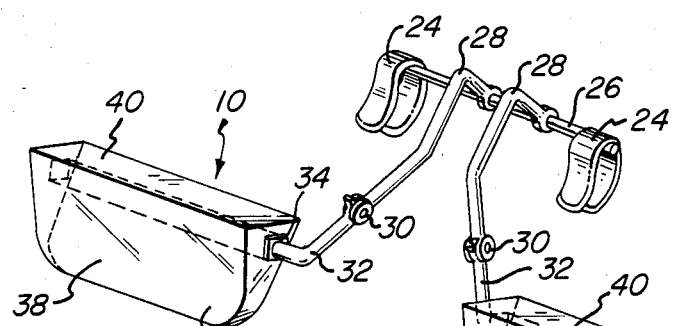
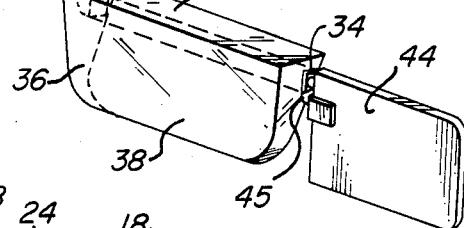
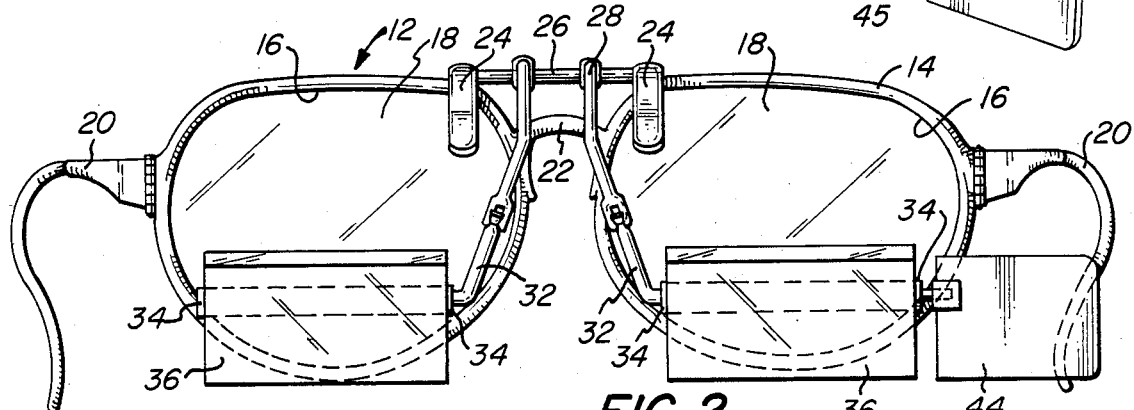
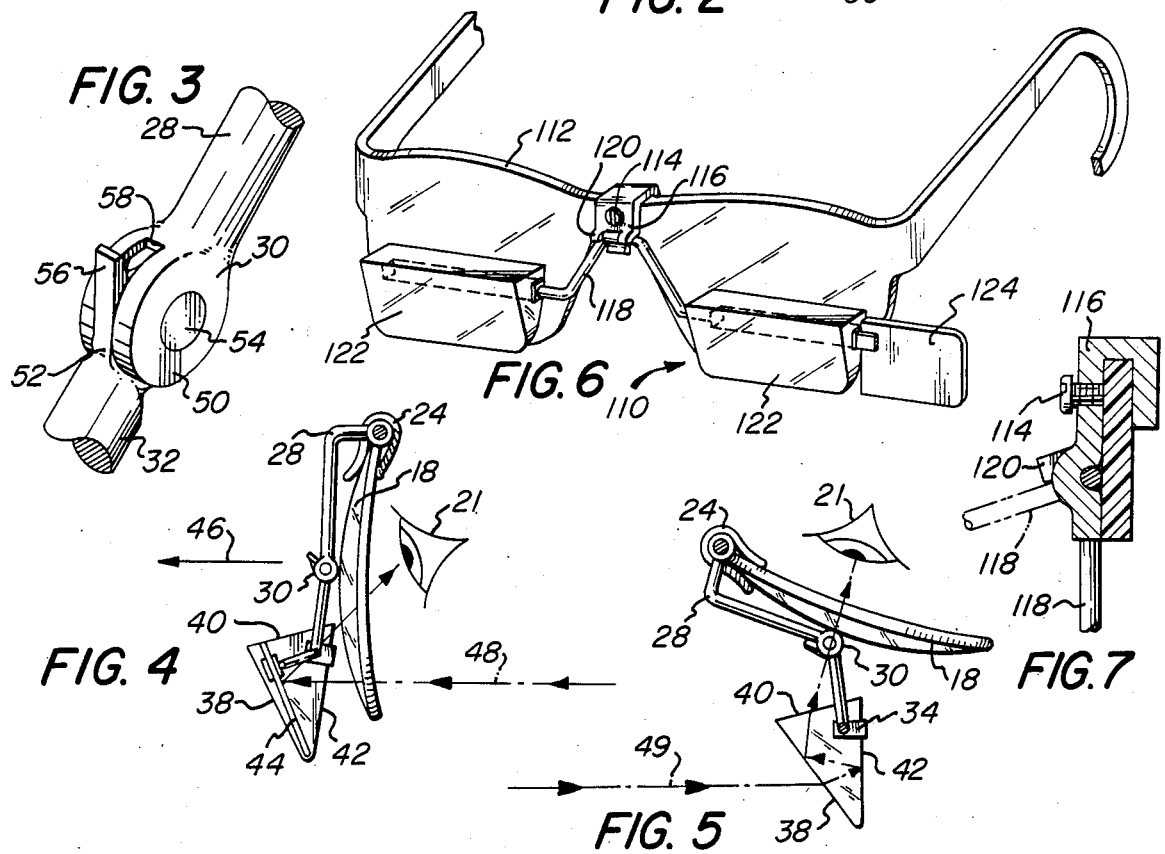
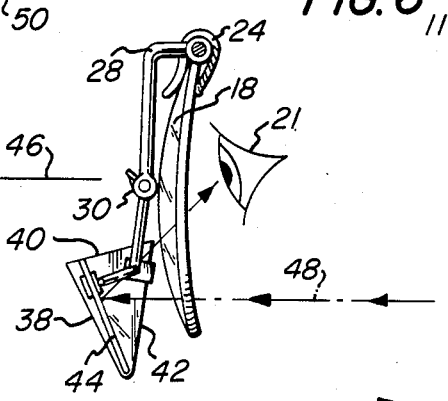

OPTICAL VIEWING ACCESSORY

BACKGROUND OF THE INVENTION

The present invention relates to an optical viewing system for bicycle riders and the like, and more particularly to an optical viewing system that permits the user to selectively view objects and positions ahead or forward of the user whilst the user's head is in either the erect or prone positions.

In recent years, bicycles for recreation, commuting to work and school, and competitive racing have become increasingly popular. This popularity has been spurred, at least in part, by the advent of the so-called "10-speed" bicycle having a multitude of adjustable gear ratios to allow the rider to maintain the same rate of cadence, the speed at which the cranks are spun around, regardless of varying grades of roadways and terrains.

The vast majority of these 10-speed bicycles are provided with downwardly curved handlebars or "dropped bars" which are located and positioned whereby the torso and back of the rider generally assumes a forward leaning posture, i.e. at an angle less than forty-five degrees from the horizontal, thereby providing less wind resistance. Use of these dropped bars is generally more efficient and comfortable than flat bars because the rider's weight is evenly distributed and supported by both hands and the seat thereby improving stability, steering characteristics, breathing capacity and the absorption of shocks. However, since the rider must view objects and positions in the desired direction of travel, the rider must hold his head in a slightly erect or upright position. During extended riding sessions, this awkward position of the head becomes quite uncomfortable, thereby greatly increasing fatigue. Further, the erect position of the head accentuates the wind resistance encountered by cyclist which is particularly critical to bicycle racers and the like.

It is an object of the present invention to provide a novel optical viewing system for bicycle riders and the like which enables the user to view objects situated in front of the user whilst the head of the user is in the prone position.

It is also an object to provide such a system which does not interfere with the normal viewing of objects when the head of the user is in an erect position.

Another object is to provide such a system which can be readily coupled to the head of the user.

Still another object is to provide such a system with a rear view mirror for increasing the field of vision of the user.

A further object is to provide such a system which may be readily and economically fabricated and which exhibits long life in service.

SUMMARY OF THE INVENTION

It has now been found that the foregoing and related objects can be readily attained in an optical viewing system including at least one prism bounded at least in part by three nonparallel planar, polygonal surfaces, headgear adapted to be received and retained on the head of the user juxtaposed adjacent the eyes of the user, and means for attaching the prism to the headgear to enable the prism to move relative to the headgear under the influence of gravity into and out of the direct line of vision of the user as the head of the user moves alternatively between forward leaning and erect positions. The prism receives incident light rays from directions ahead of user and reflect the light rays into alignment with the direct line of vision of the user when the head of the user is in the forward leaning or prone position.

Preferably, one of the nonparallel, planar, polygonal surfaces of the prism is a total internal reflecting surface to direct the incident light rays therethrough. The system may also include a mirror device mounted on one of the prisms to permit the viewing of objects to the rear of the user.

Ideally, the attaching means includes a stop member to limit movement and prevent oscillation of the at least one prism when the user's head is in the prone position. Further, the attaching means includes one or more hinge elements operatively connected to the at least one prism thereby permitting independent movement of the prism.

Conveniently, the headgear can be a pair of glasses (eye, sun or safety) having a frame with a pair of lenses therein, and the attaching means includes spring clips for releasably fastening the prism to the glasses. The at least one prism assumes a position immediately adjacent the optical lenses and out of the direct line of vision of the user when the head of the user is in the erect position and a position spaced from the optical lenses and in the direct line of vision of the user when the head of the user is in the prone position.

The headgear may be transparent goggles or a transparent safety shield with the optical viewing appliance affixed thereto.

The invention will be fully understood when reference is made to the following detailed description taken in conjunction with the accompanying drawing.

BRIEF DESCRIPTION OF THE DRAWING

FIG. 1 is a perspective view of an optical viewing accessory embodying the present invention;

FIG. 2 is a front elevational view of a pair of eyeglasses having mounted thereon the optical viewing accessory illustrated in FIG. 1 thereby forming an optical viewing system;

FIG. 3 is an enlarged fragmentary perspective view of a pivotal connection from the optical viewing accessory of FIG. 1;

FIG. 4 is a diagrammatic partial side elevational view of the optical viewing system of FIG. 2 shown in normal use with the head of the user in an erect position and the optical viewing accessory in a retracted position;

FIG. 5 is an illustration similar to FIG. 4 with the rear view mirror removed for clarity of illustration and showing the head of the user in a prone position and the optical viewing accessory in an extended position;

FIG. 6 is a perspective view of a second embodiment of the optical viewing system of the present invention; and FIG. 7 is an enlarged fragmentary partial sectional view of the embodiment of FIG. 6 with the prism holding bracket shown in its extended and retracted positions.

DETAILED DESCRIPTION OF PREFERRED EMBODIMENTS

Referring first to FIG. 2, therein illustrated is the preferred embodiment of an optical viewing accessory embodying the present invention and generally indicated by the numeral 10 as mounted on a pair of conventional eyeglasses or spectacles, generally designated by the numeral 12, to form an optical viewing system. The eyeglasses 12 include a frame 14 defining a pair of openings 16 for receiving optical lenses 18 therein and a pair of pivoted side temples 20 designed to cooperate with the ears of the user. The optical viewing system depicted in FIGS. 2 and 4 is shown in its upright position with the optical viewing accessory 10 retracted from the direct line of sight 46 of the eyes 21 normal to the face of the user.

Extending outwardly from a central or bridge portion 22 of the eyeglasses 12 is the optical viewing accessory 10. The accessory 10 has a pair of resilient spring clips 24 which releasably fasten the accessory 10 to the eyeglass frame in a conventional manner. These spring clips 24 are mounted on either end of a central support bar 26, thereby providing a rigid support for the accessory 10. Secured to the support bar 26 between the spring clips 24 thereon are a pair of L-shaped leg portions 28 which extend downwardly and expand outwardly therefrom.

Mounted to the lower or terminal ends of the L-shaped leg portions 28 by means of pivotal connections 30 are prism holding brackets 32. Each of the prism holding brackets 32 includes a pair of spaced fingers 34 which mechanically engage an associated prism 36 to hold the same securely in position.

The prisms 36 are identical solid, transparent prisms bounded by three nonparallel, polygonal surfaces 38, 40 and 42. Preferably, the surface 42 of each prism 36 is silvered, thereby creating a highly reflective surface to accentuate the internal reflection of the prism 36. Preferably, the angles between surfaces 38 and 40 and surfaces 40 and 42 are seventy-two and one-half degrees, while the angle between surfaces 38 and 42 is thirty-five degrees. Each of the illustrated prisms 36 would be approximately 40 millimeters in length.

As illustrated in FIG. 3, each of the pivotal connections 30 includes a disc-shaped bifurcated end portion 50 on the L-shaped leg portion 28 cooperatively dimensioned to receive a flattened end portion 52 of an associated prism holding bracket 32. The bifurcated end portion 50 and the flattened end portion 52 each include a centrally located opening for receiving pivot pin 54 therethrough, thereby forming the pivotal connection 30 to permit relative movement between the leg portion 28 and the bracket 32 about the axis defined by the pivot pin 54. For purposes hereinafter explained, this relative swinging movement between the leg portion 28 and the bracket 32 is limited by the interaction of finger piece 56 extending from the end portion 52 and abutment stop 58 located at the central juncture of the bifurcated end portion 50.

Attached to an outer portion of one of the prisms 36 is a rear view mirror 44. The mirror 44 is mounted utilizing pivotal connection 45 so as to be angularly adjustable relative to the eyes of the user, thereby having the effect of increasing the field of vision to the rear thereof. The mirror 44 can be planar, convex or concave depending upon the desired field of vision.

The operation and use of the optical viewing system of the present invention is illustrated in FIGS. 4-5. The optical viewing accessory 10 has been releasably attached to the outer portion of the eyeglasses 12 to extend opposite the eyes 21 of the user. In FIG. 4, the head of the user is in upright or erect position with the direct line of sight of the eyes 21 normal to the face of the user indicated by the arrow 46. In this position, the optical viewing system will assume its retracted position withdrawn from the direct line of sight 46. Further, the eyes of the user can receive incident light rays 48 from the rear view mirror 44, thereby expanding the field of vision of the user.

When the user moves his head to a downward or prone position, as a bicyclist would to minimize wind resistance and fatigue, the prism brackets and prisms pivot under the influence of gravity around the pivot axes defined by the pivotal connections 30, thereby assuming the extended position shown in FIG. 5. By looking through surfaces 40, the eyes 21 of the user can receive incident light rays 49 from positions and objects ahead of the user as the rays enter through surfaces 38 and are internally reflected from silvered surfaces 42 and surfaces 38.

It should be noted that the finger piece 56 and abutment stop 58 of the pivotal connections 30 are designed to limit the swing of the prism brackets 32 in the extended position when the head of the user is in the prone position. Thus, the gravitational force on the prisms 36 and the brackets 32 creates a corresponding force on the abutment stop 58 through the finger piece 56 so the prisms 36 are fixed and centered relative to the eyes 21, thereby preventing oscillation of the prisms 36 and facilitating viewing therethrough.

In FIGS. 6 and 7, there is illustrated a modified embodiment of an optical viewing system of the present invention. The system includes eyewear 112 in combination with an optical viewing accessory generally indicated by the numeral 110. The eyewear 112 is non-prescription and is molded in one piece from high impact transparent plastic. The optical viewing accessory 110 is provided with a mounting bracket 116 releasably secured to the bridge of the eyewear 112 by screw 114. The mounting bracket 116 pivotally suspends a prism holding bracket 118. More particularly, the bracket 118 has a U-shaped portion, the base of which is loosely captured in an opening formed between the mounting bracket 116 and the bridge of the eyewear 112. As will be more clearly understood when considering FIG. 7, the legs of the U-shaped portion of the holding bracket 118 extend downwardly and diverge outwardly from the base thereof to cooperate with a pair of abutments or stops 120 on the mounting bracket 116 to limit the relative swinging movement between the associated parts as the accessory moves alternatively between its retracted position shown in solid line in FIG. 7 and its extended position shown in phantom line. Located at the ends of the legs of the U-shaped portion of the bracket 118 are the prisms 122 suspended from the bracket in a manner similar to the prisms 36 of the embodiment of FIGS. 1-5.

The second embodiment of the optical viewing system operates and is used in a manner similar to FIGS. 4-5. However, the length of pivotal radius in the second embodiment is greater than the length in the FIGS. 1-5 embodiment. Thus, there will be a corresponding greater distance between the eye of the user and the pair of prisms 122 when the accessory assumes its extended position. The optical viewing accessory of FIG. 6 also includes a rear view mirror 124 attached to one of the prisms 122.

The prisms are generally ground from conventional glass materials or may be molded from plastic materials and can be provided with a wide variety of bounded angles to achieve satisfactory results. Further, the pair of prisms illustrated herein could be replaced by a single enlarged prism, however, the illustrated dual prism arrangement provides adequate clearance for the nose of the user therebetween. The fingers of the prism support bracket can be replaced by other well-known attachment means, such as adhesive, screws, and the like.

The framework of the optical viewing accessory which includes the spring clips, support bar, L-shaped leg portions and prism support brackets can be fabricated from metallic materials but also can be molded from a suitable plastic resin, such as polyethylene, polypropylene, high impact polystyrene, and the like.

The pair of pivotally mounted prism brackets can have a bar element and the like extending therebetween to permit the brackets to swing around the pivotal connections in unison. The stop or abutment portions of the pivotal connections can be a pin or a flange extending into the path of movement of the brackets.

It should be appreciated that the accessory can be modified to be attachable or permanently attached to various kinds of eyeglasses including rimless and half-rim frames with sun, safety and/or prescription lenses. The accessory can also be modified for use with a helmet, a molded safety shield, a pair of goggles or in combination with a head strap.

Thus, it can be seen from the foregoing detailed specification and attached drawing that the optical viewing system of the present invention provides an effective means to increase the field of vision of the user.

The preferred embodiments described above admirably achieve the objects of the invention; however, it will be appreciated that various changes and departures can be made by those skilled in the art without departing from the spirit and scope of the invention which is limited only by the following claims.

Having thus described the invention, I claim:

1. An optical viewing system for use by a bicycle rider and the like, comprising:
   (A) at least one solid, transparent prism bounded at least in part by three nonparallel planar, polygonal surfaces;
   (B) headgear means adapted to be received and retained on the head of the user juxtaposed adjacent the eyes thereof; and
   (C) means for attaching said at least one prism to said headgear means to enable said at least one prism to freely pivot relative to said headgear under the influence of gravity thereby permitting movement of said at least one prism into and out of the direct line of vision of the user as the head of the user moves alternatively between prone and erect positions, whereby said at least one prism receives incident light rays from a direction ahead of user and reflects the light rays into alignment with the direct line of vision of the user when the head of the user is in the prone position and permits unobstructed viewing when the head of user is in the erect position.

2. The optical viewing system in accordance with claim 1 wherein one of said nonparallel, planar, polygonal surfaces is a total internal reflecting surface to direct the incident light rays through said at least one prism.

3. The optical viewing system in accordance with claim 1 wherein said attaching means includes at least one stop member to limit movement and oscillation of said at least one prism when the user's head is in the prone position.

4. The optical viewing system in accordance with claim 1 wherein said at least one solid, transparent prism is a pair of solid, transparent prisms, each of said prisms bounded at least in part by three nonparallel, planar, polygonal surfaces.

5. The optical viewing system in accordance with claim 1 wherein said attaching means includes a holding bracket for said at least one prism and a mounting bracket pivotally supporting said holding bracket to said headgear means.

6. The optical viewing system in accordance with claim 5 wherein said holding bracket is captured for pivotal movement by said mounting bracket and said headgear means in an opening formed therebetween.

7. The optical viewing system in accordance with claim 6 wherein said holding bracket has engagement finger portions mechanically attaching said at least one prism thereto.

8. The optical viewing system in accordance with claim 5 wherein said mounting bracket includes abutment means to limit movement and prevent oscillation of said at least one prism when the user's head is in the prone position.

9. The optical viewing system in accordance with claim 1 wherein said headgear means is a pair of eyeglasses, said attaching means includes clip means for releasably fastening said at least one prism to said eyeglasses.

10. The optical viewing system in accordance with claim 9 wherein said at least one prism assumes a position below the direct line of sight of the user when the head of the user is in erect position.

11. The optical viewing system in accordance with claim 1 further including a mirror device mounted on said at least one prism to permit viewing of objects to the rear of the user.

12. An optical viewing system for use by bicycle riders and the like, comprising:
   (A) a pair of eyeglasses;
   (B) at least one solid transparent prism bounded at least in part by three nonparallel, planar polygonal surfaces; and
   (C) means pivotally attaching said at least one prism to said eyeglasses for free swinging movement relative to said eyeglasses under the influence of gravity between a position below direct line of sight of the user to a position in the direct line of sight of the user as the head of the user moves between an erect position and a prone position.

13. The optical viewing system in accordance with claim 12 wherein said at least one prism is a pair of prisms.

14. The optical viewing system in accordance with claim 13 wherein said pivotal attaching means includes framework means releasably fastening said pair of prisms to said eyeglasses.

15. The optical viewing system in accordance with claim 14 wherein said framework means includes a support bar extending across a bridge portion of said eyeglasses, a pair of spring clips spaced apart on a support bar and releasably fastened to said eyeglasses, and a pair of L-shaped leg portions extending from said support bar, each of said leg portions pivotally mounting a holding bracket with one of said prisms thereon.

16. The optical viewing system of claim 15 wherein said prism holding brackets have finger portions mechanically fastening said prisms thereto.

17. The optical viewing system in accordance with claim 14 wherein said framework means includes a pair of pivotal connections at a medial portion thereof to permit movement of said pair of prisms from a position immediately adjacent said eyeglasses to a position spaced outwardly therefrom.

18. The optical viewing system in accordance with claim 17 wherein said pivotal connections include stop means to limit pivotal movement and prevent oscillation of said pair of prisms when the user's head is in the prone position.

19. The optical viewing system in accordance with claim 12 further including a mirror device mounted on said at least one prism to permit viewing of objects to the rear of the user.

20. The optical viewing system in accordance with claim 12 wherein said pivotal attaching means is permanently mounted to said pair of eyeglasses.

* * * * *